R. WHITAKER.
VALVE FOR GAS PUMPS.
APPLICATION FILED NOV. 5, 1906.
899,584.
Patented Sept. 29, 1908.
2 SHEETS—SHEET 2.
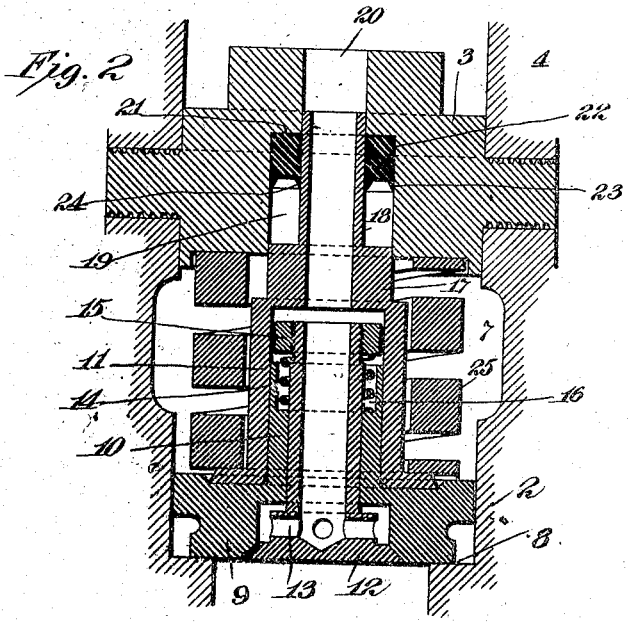
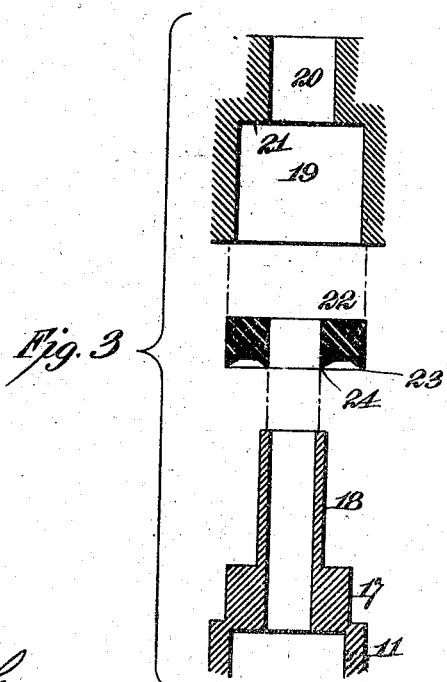
Witnesses:
Jas. F. Oleman
John P. Koch
Inventor
Richard Whitaker
By Dyer & Dyer
Attorneys.

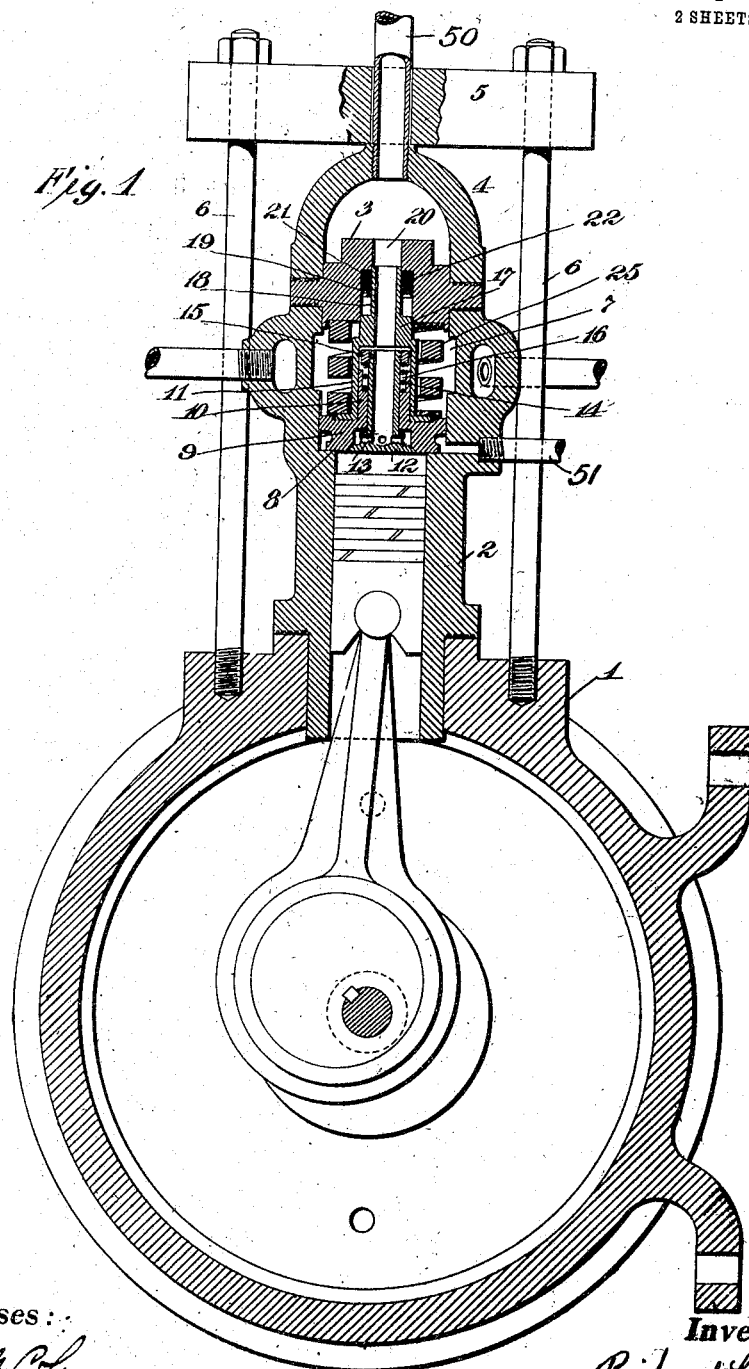

UNITED STATES PATENT OFFICE.

RICHARD WHITAKER, OF NEW BRUNSWICK, NEW JERSEY, ASSIGNOR TO THE BRUNSWICK REFRIGERATING COMPANY, A CORPORATION OF NEW JERSEY.

VALVE FOR GAS-PUMPS.

No. 899,584.      Specification of Letters Patent.      Patented Sept. 29, 1908.

Application filed November 5, 1906. Serial No. 342,055.

*To all whom it may concern:*

Be it known that I, RICHARD WHITAKER, a citizen of the United States of America, residing at New Brunswick, county of Middlesex, State of New Jersey, have invented an Improvement in Valves for Gas-Pumps, of which the following is a specification.

This invention relates to improvements in valves for gas pumps, particularly for pumps used in connection with the ammonia compression refrigerating apparatus.

The invention is a modification of the valve shown in my application Serial No. 188,612 filed January 11, 1904.

By the present invention, a duplex valve (*i. e.* one in which the inlet valve is carried by the outlet valve) is used, in which the area of equilibrium surface is increased and the size of the spring is very much reduced.

The invention is particularly applicable to pumps of small size, as it permits the rod or spindle of the outlet valve to be made of the smallest size, thereby securing a large equilibrium surface and permitting a small seating spring.

I attain the objects of my invention by the mechanism shown in the accompanying drawings, in which Figure 1 is a sectional view of a pump embodying my invention, Fig. 2 is an enlarged view, in section, of the valve, Fig. 3 is a view of parts of the valve before they are assembled.

In the drawings like parts are designated by the same reference characters.

In Fig. 1 is shown a pump similar to that of my application for patent before referred to, except for the valve.

1 is the crank casing, 2 the cylinder, 3 the valve cover, 4 the crown of the valve cover, 5 the cross-head, and 6, 6 the bolts which clamp the crown 4 upon the cover 3 and hold the cylinder 2 in place upon the crank casing and the valve cover 3 in place upon the cylinder, as is disclosed in my co-pending application before identified. The joints below the top of the cylinder and valve cover and valve cover and crown are made with concentric grooves, which effectually prevent leakage and serve as concentric condensing elements if leakage should occur. A gas-inlet tube 50 extends through the crown 4 to the gas chamber formed therein and said chamber is in communication with the hollow spindle of the inlet valve hereinafter referred to.

The bore of the cylinder 2 is provided with an enlargement forming an equilibrium chamber 7. At the base of the chamber is a shoulder which forms the valve seat 8. The outlet valve 9 is within the equilibrium chamber and rests upon the valve seat 8. The valve has an integral spindle 10 which is surrounded by a separable spindle 11, which is provided with a flange at its base which rests upon the upper surface of the outlet valve. The side of the outlet valve is provided with an annular groove which communicates with a draw-off pipe 51, as shown. The joint between the valve and the sides of the chamber is not a close one, but on the contrary is sufficiently free to permit the passage of gas into the equilibrium chamber above the valve.

Within the integral spindle 10 is the inlet valve 12, which inlet valve has a hollow spindle, constituting a passage which communicates with ports or openings 13 adjacent to its base. The inlet valve is seated by means of a spring 14, and a nut 15 engages with the spring. This spring lies within an annular recess 16 formed upon the upper part of the spindle 10.

The separable spindle 11 which surrounds the integral spindle of the outlet valve, has a reduced portion 17 and a smaller reduced portion 18. The reduced portion 17 is of such a size as to freely slide within an opening 19 in the valve cover 3. The opening 19 communicates with a smaller opening 20, which is of such a size as to permit the reduced portion 18 to freely slide within it. The upper part of the chamber 19, where it communicates with the chamber 20 is squared off in order to form a shoulder 21. The spindle 11 of the outlet valve has a central opening which is preferably the same size as the center opening of the inlet valve 12. The walls of the reduced portion 18 are made thick enough in order to possess sufficient strength, but are preferably made no thicker than is necessary.

Means is provided for preventing leakage from the chamber 7 around the reduced portion 18. This means consists preferably of the packing shown, which comprises a soft rubber washer 22, which washer lies within the chamber 19 and is forced against the shoulder 21 by the pressure within the chamber 7. The lower face of the washer is preferably concave, forming annular lips 23, 24. The washer is preferably of larger diameter than the diameter of the chamber 19, and the central opening within the washer is preferably of smaller size than the reduced portion 18 of the outlet valve spindle. The proportions of the parts are shown in Fig. 3. In assembling the device, the washer 22 is compressed and crowded into the chamber 19, so that it abuts against the shoulder 21. The spindle 18 is then crowded through the central opening of the washer so that it is compressed against the walls of the chamber 19 and against the spindle 18, so that it will assume the form shown in Fig. 2.

The annular lips 23, 24 will effectually prevent leakage around the washer. The elasticity of the washer is sufficient to permit the necessary up-and-down movement of the outlet valve spindle in order to permit the opening and closing of this valve. This movement, in practice, will seldom exceed five one-thousandths of an inch.

The outlet valve is seated by means of a spring 25 which lies within the equilibrium chamber 7 and bears against the under surface of the valve cover 3, and the flange of the base of the separable valve stem 11. This effectually closes the joint between the valve and the removable stem and prevents leakage at that point. The area of equilibrium surface is very large, as it is equal to the surface of the valve minus the small area occupied by the spindle 18. This spindle, as already pointed out, need be no larger than necessary to carry the passage to the inlet valve and hence may be very small. By utilizing this construction, the size of the spring is reduced and it is possible to effectually seat the valve even when the pump is used for compressing gas under very high pressures.

The valve is readily taken apart by slacking up on the nuts or bolts 6, lifting the crosshead and disengaging the crown 4 from engagement with the cover 3. Upon lifting the cover, the removable spindle will be taken out with it, leaving the rest of the outlet valve with the inlet valve within the equilibrium chamber. These may be readily removed.

It will be understood that the invention is not limited to the details shown, as the outlet valve could be made without the separable spindle by changing the construction of the inlet valve. Furthermore, the packing around the stem of the outlet valve could be different from that shown, and could comprise ordinary piston rod packing set up with a gland, as is shown in my co-pending application before referred to.

By this invention, an outlet valve of the same diameter as the piston may be used, with an inlet valve nearly as large; consequently the movement of the valves is small, and the dead space between the piston and valves is reduced to a minimum. This type of valve is materially better for compressing gas under high pressure than those in which the outlet and inlet valves are separate.

Cross-reference is made to my application Serial Number 239,724 filed January 5, 1905 (Patent No. 866,832, dated September 24, 1907) which was divided out of my application Serial Number 188,612 filed January 11, 1904 and describes a casing having an equilibrium chamber and a duplex valve, the construction differing from the construction herein claimed however in that the construction shown in said application involved an inlet valve whose spindle extended outside of the equilibrium chamber and did not present an outlet valve having the inner and outer spindles of this application or the features coöperating therewith.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now particularly described my invention, and in what manner the same is to be performed, I declare that what I claim, and desire to secure by Letters Patent, is:

1. In a duplex valve, the combination with a casing having an equilibrium chamber, an outlet valve and an inlet valve carried thereby, the outlet valve spindle only extending outside of the equilibrium chamber.

2. A valve for gas pumps comprising a casing having an equilibrium chamber, an outlet valve having an inner and an outer spindle, the outer spindle having a reduced portion which extends outside of the equilibrium chamber, and an inlet valve carried by the outlet valve.

3. A duplex valve for gas pumps comprising a casing having an equilibrium chamber, a gas inlet chamber separated by a wall from said equilibrium chamber, an outlet valve whose spindle extends through an opening in said wall, a soft rubber washer surrounding said spindle to prevent leakage around the same out of said equilibrium chamber, and an inlet valve carried by said outlet valve.

4. A duplex valve for gas pumps comprising a casing having an equilibrium chamber, a gas inlet chamber separated by a wall from said equilibrium chamber, an outlet valve whose spindle extends through an opening in said wall, a soft rubber washer surrounding said spindle to prevent leakage around the same out of said equilibrium chamber, and an inlet valve carried by said outlet valve, said spindle of the outlet valve being of reduced diameter where it passes through said opening and said packing being compressed in place and expanded over the spindle.

5. A duplex valve for gas pumps comprising a casing having an equilibrium chamber, a gas inlet chamber separated by a wall from said equilibrium chamber, an outlet valve whose spindle extends through an opening in said wall, a soft rubber washer surrounding said spindle to prevent leakage around the same out of said equilibrium chamber, and an inlet valve carried by said outlet valve, said spindle of the outlet valve being of reduced diameter where it passes through said opening and said packing being compressed in place and expanded over the spindle and having annular lips engaging the spindle and the wall of the equilibrium chamber.

6. A duplex valve for gas pumps comprising a casing having an equilibrium chamber and a valve seat, an outlet valve adapted to said seat and having an inner hollow spindle and an outer encompassing spindle flanged to engage the upper surface of said valve and having a reduced upper portion extending through a wall of said chamber, a spring engaging at its lower end said flange of said valve spindle and at its upper end the upper wall of said chamber, an inlet valve carried by said outlet valve, a spring for seating said inlet valve, and a packing for the upper portion of the outer spindle of said outlet valve.

7. A duplex valve for gas pumps comprising a casing having an equilibrium chamber, a valve seat and a cover having a lower opening (19) and an upper opening (20) of smaller diameter and concentric therewith, an outlet valve adapted to said seat and having an inner hollow spindle and an outer encompassing spindle flanged to engage the upper surface of said valve and having a reduced portion to enter and guide in said lower opening and a further reduced portion extending through said upper opening, a spring engaging at its lower end said flange of said valve spindle and at its upper end said cover, an inlet valve carried by said outlet valve, a spring for seating said inlet valve, and a packing in the upper end of said lower opening for the upper reduced end of said outer spindle of the outlet valve.

This specification signed and witnessed this 31st day of October, 1906.

RICHARD WHITAKER.

Witnesses:
EDWARD MORRIS,
J. L. CARBERRY.